United States Patent
Abney, III et al.

(12)

(10) Patent No.: US 9,361,334 B2
(45) Date of Patent: Jun. 7, 2016

(54) ADDRESSING CACHE COHERENCE IN UPDATES TO A SHARED DATABASE IN A NETWORK ENVIRONMENT

(71) Applicant: CISCO TECHNOLOGY, INC., San Jose, CA (US)

(72) Inventors: John Miller Abney, III, Bellaire, TX (US); Saravanan Lakshmanan, Sugar Land, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 308 days.

(21) Appl. No.: 13/975,039

(22) Filed: Aug. 23, 2013

(65) Prior Publication Data

US 2015/0058302 A1 Feb. 26, 2015

(51) Int. Cl.
*G06F 17/30* (2006.01)
(52) U.S. Cl.
CPC .................. *G06F 17/30371* (2013.01)
(58) Field of Classification Search
None
See application file for complete search history.

(56) References Cited

U.S. PATENT DOCUMENTS

2003/0163439 A1* 8/2003 Hankin .............. G06F 17/30607
2004/0224674 A1* 11/2004 O'Farrell .......... G06F 17/30575
  455/418
2013/0283096 A1* 10/2013 Baker ............... G06F 17/30386
  714/15

OTHER PUBLICATIONS

EclipseLink, Understanding EclipseLink, Release 2.4, Dec. 2012, pp. 1-168.*
Kent, Cache Coherence in Distributed Systems, Dec. 1987, pp. 1-90.*
S. Lametti, "Cache Coherence Techniques," Dec. 1, 2010, 39 pages; http://www.di.unipi.it/~vannesch/SPA%202010-11/Silvia.pdf.
"Locking Tables and Databases," Mar. 2004, 5 pages; http://publib.boulder.ibm.com/infocenter/rbhelp/v6r3/index.jsp?topic=%2Fcom.ibm.redbrick.doc6.3%2Fwag%2Fwag80.htm.
Wikipedia, the free encyclopedia, "MSI Protocol," [retrieved and printed Jun. 30, 2013], 2 pages; http://en.wikipedia.org/wiki/MSI_protocol.

* cited by examiner

*Primary Examiner* — Albert Phillips, III
(74) *Attorney, Agent, or Firm* — Patent Capital Group

(57) ABSTRACT

Example embodiments are provided that may include receiving a request to update a particular object based on a modified object, where the particular object is one of a number of objects in a shared database, and the request includes an identification of one or more referenced objects and version information of the one or more referenced objects. Embodiments further include determining whether any of the referenced objects is stale based on the version information, where the particular object is not updated if any of the referenced objects is stale. More specific embodiments include updating the particular object if none of the referenced objects is stale. In yet further embodiments, determining a referenced object is stale is based on a comparison of a version identifier of the referenced object and a version identifier of an object in the shared database that corresponds to the referenced object.

24 Claims, 4 Drawing Sheets

ADDRESSING CACHE COHERENCE IN UPDATES TO A SHARED DATABASE IN A NETWORK ENVIRONMENT

TECHNICAL FIELD

This disclosure relates in general to the field of data integrity in a network environment and, in particular, to techniques that address cache coherence in updates to a shared database.

BACKGROUND

Enterprises and other entities have become increasingly reliant upon data centers to provide network services needed to conduct business or other desired activities. Data center operators often attempt to increase efficiency and reduce costs by implementing information technology (IT) process automation platforms. These platform installations are typically composed of multiple network elements, such as servers that perform various activities to provide desired services. Data used by these network elements for their operations may be based on a single authoritative copy of the data, for example, in a shared database. Since modifications to the data can occur on multiple network elements, however, caches in the network elements that include a copy of the data may have different states. With the increasing dependence on data centers, it is important to maintain cache coherence between network elements in a given platform so that consistent results are achieved.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
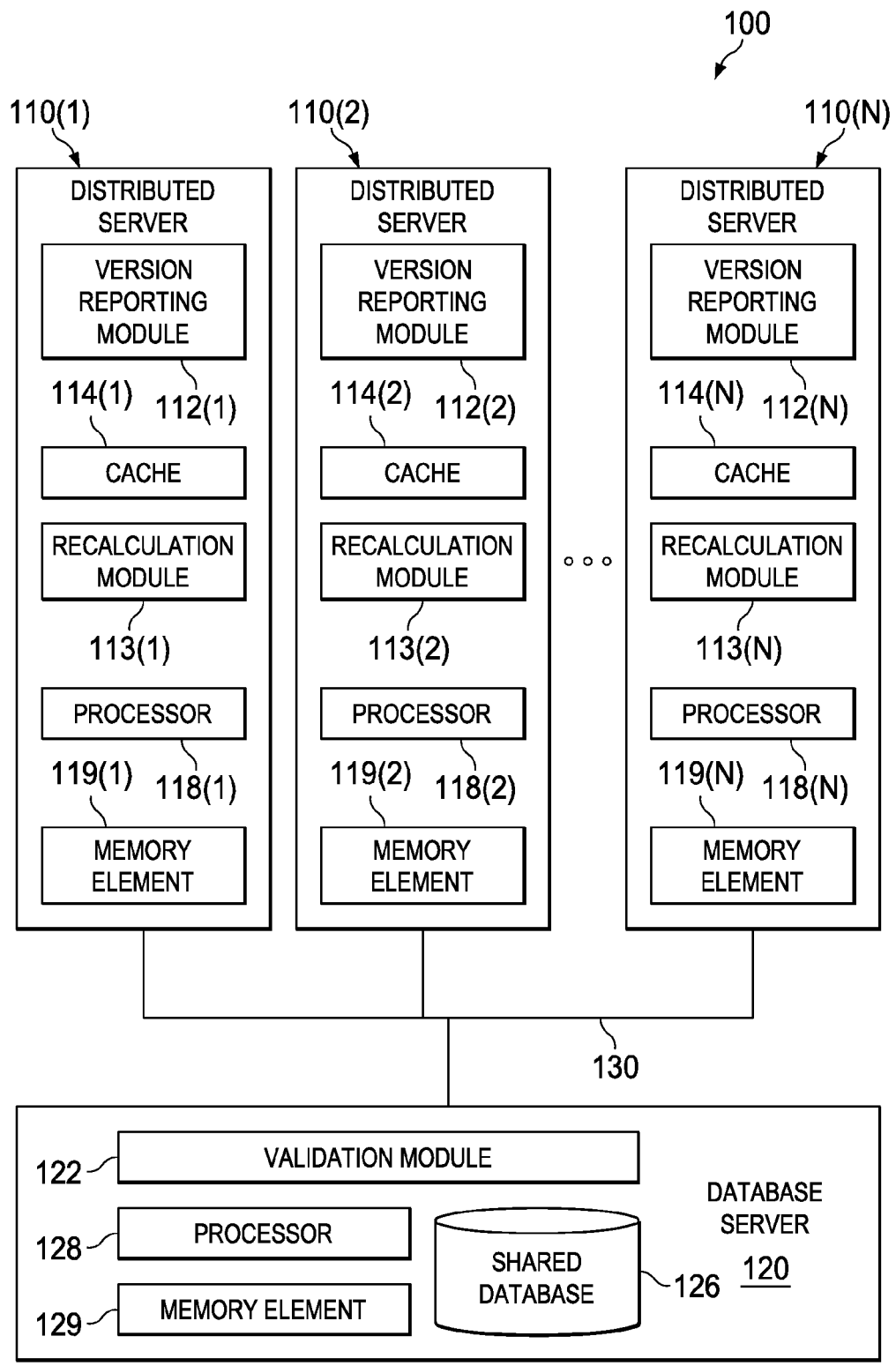
FIG. 1 is a simplified block diagram of a communication system for providing cache coherence in a network environment according to at least one embodiment.

A method is provided in one example and includes receiving a request to update a particular object based on a modified object. The particular object is one of a number of objects in a shared database and the request includes an identification of one or more referenced objects. The request also includes version information of the one or more referenced objects. The method further includes determining whether any one of the referenced objects is stale based on the version information, and the particular object is not updated if any one of the referenced objects is stale.

This and other embodiments can optionally include the following features. The modified object can be derived, at least in part, based on the one or more referenced objects. The method can include updating the particular object in the shared database based on the modified object if none of the referenced objects is stale. The version information can include a version identifier of a referenced object. The determination that the referenced object is stale can be based on a comparison of the version identifier of the referenced object and a version identifier of an object in the shared database that corresponds to the referenced object. The method can further include providing error information if at least one of the referenced objects is stale, and the error information can include an identification of the at least one referenced object that is stale. The error information can include version information associated with at least one object in the shared database, where the at least one object in the shared database corresponds to the at least one referenced object identified in the error information as stale. The update request can be received from a distributed server.

Another method is provided in another example and includes sending a request to update a shared database based on a modified object derived using one or more referenced objects, receiving error information indicating at least one of the referenced objects is stale, requesting an up-to-date version of the at least one referenced object, and sending a second request to update the shared database based on a second modified object derived using at least the current version of the at least one referenced object.

This and other embodiments can optionally include the following features. The method can include receiving a new version identifier of the second modified object, and associating the new version identifier with the second modified object in a local cache of a distributed server. The request to update the shared database can include an identification of the one or more referenced objects and version information associated with the one or more referenced objects. The version information can include one or more version identifiers associated respectively with the one or more referenced objects. The error information can include an identification of the at least one referenced object that is stale and version information of at least one object in the shared database, where the at least one object in the shared database corresponds to the at least one referenced object that is stale.

Example Embodiments

FIG. 1 is a simplified block diagram of a communication system 100 for providing cache coherence in updates to a shared database. Communication system 100 can include multiple distributed servers 110(1), 110(2), through 110(N) and a shared database 126 of a database server 120. Distributed servers 110(1)-(N) and database server 120 can communicate via a network 130. In at least one embodiment, distributed servers 110(1)-(N) represent distinct computing devices that operate as a single computing system and are interconnected via network 130. Distributed servers 110(1)-(N) can include respective version reporting modules 112(1)-(N), recalculation modules 113(1)-(N), and caches 114(1)-(N). Distributed servers 110(1)-(N) can also include suitable hardware such as respective processors 118(1)-(N) and memory elements 119(1)-(N). Shared database 126 may be provided in database server 120, which can include a validation module 122 and appropriate hardware such as a processor 128 and a memory element 129. In some instances, one or more of distributed servers 110(1)-(N) and database server 120 can be included within a system of computing devices, such as a data center. Further, an IT process automation platform may be implemented in the system of computing devices in which a shared repository, such as shared database 126, retains an authoritative copy of data used by distributed servers 110(1)-(N) to perform their operations.

Elements of FIG. 1 may be coupled to one another through one or more interfaces employing any suitable connections (wired or wireless), which provide viable pathways for network communications. Additionally, one or more of these elements of FIG. 1 may be combined or removed from the architecture based on particular configuration needs. For ease of illustration where appropriate, a single distributed server (e.g., distributed server 110(1)) and its various components may be described and referenced herein with respect to various embodiments, although such descriptions and references can be applicable to the other distributed servers (e.g., distributed servers 110(2)-(N)) and their components, shown in FIG. 1.

For purposes of illustrating the techniques of communication system 100, it is important to understand the activities that may be present in a given network, such as network 130 shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

Data centers often implement process automation platforms that enable automation of information technology (IT) workflows to deliver defined services. Generally, such implementations involve multiple servers and a database system that offers a shared database to the servers. The servers are often highly distributed and perform different types of work and orchestrations executing IT automation workflows. Each server maintains a local cache of data that is necessary for its operation. Consequently, this system of computing devices can have multiple caches and one single, authoritative database (also referred to herein as a 'shared database'). The data in the multiple caches is based on the data in the shared database.

Because modifications can occur on any server, at any given time each server could have at least a slightly different cache state. Typically, local caches are write-through caches. Accordingly, when a modification to a data value originates on a particular server, the server modifies the value in the shared database in addition to the value in its own cache. The changes to the shared database propagate to other servers over time, as needed, to maintain cache coherence. The term 'cache coherence' refers to the state of consistency between separate caches. It is desirable to maintain cache coherence in the system, at least in part, to prevent inconsistent results that could occur when servers perform workflows with stale data.

Challenges persist in maintaining cache coherence and the integrity of a shared database. One challenge involves handling modifications in a safe manner. For example, if a value of an object is modified using stale data, then the resulting modified value may be incorrect. By way of illustration, assume A, B, and C are objects such as variables in a shared database. Also assume a particular server modifies the value of C using the equation $C=A+B$. If either or both of the values of A and B are stale in the server's cache (i.e. not consistent with the values of A and B in the shared database), then the resulting modified value of C may be incorrect. An incorrect result could potentially lead to undesirable or even dangerous results, depending on the particular services being affected. Thus, cache coherence is desirable to enable modifications to data values (e.g., C in the previous example) using the most current versions of referenced data values (e.g., A and B in the previous example).

In multi-core computer processing unit (CPU) systems and multi-CPU systems, cache coherency protocols may maintain consistency using intra-cache buses. These buses can enable visibility into which cache entries are valid or invalid. With distributed servers, however, synchronization via an intra-cache bus architecture is not practicable and, in many cases, not feasible. Communication on a single piece of hardware, such as multi-core CPU or multi-CPU systems can be tightly coordinated and communication can occur almost simultaneously with data modifications. In a distributed system, however, there is looser coordination, and communication between servers and a shared database may be delayed relative to data modifications by the servers. Thus, distributed caches may be unable to maintain a tight coordination. Consequently, a cache coherence protocol in a distributed architecture is needed to accommodate scenarios in which updates to a shared database may be attempted with stale data, and in which an authoritative copy of the data is maintained on the shared database.

In accordance with one example implementation, communication system 100 can resolve the aforementioned issues associated with cache coherence between distributed servers' caches and a shared database. Communication system 100 uses a versioning scheme to cross reference versions of certain data in the distributed servers' caches with versions of corresponding data in the shared database. More specifically, communication system 100 provides a shared database server that can preserve the integrity of a shared database in a single transaction when a particular distributed server requests an update (e.g., a write action, etc.) to the shared database based on a modified object. In the transaction, the database server can determine whether any stale data was used by the requesting server to derive a final value of the modified object, and can take appropriate action based on the result. In order to enable this determination, the requesting server provides the database server with an identification of objects that were referenced (referred to herein as 'referenced objects') when deriving the final value of the modified object, and also provides version information associated with the referenced objects. The version information enables the database server to determine whether any one of the referenced objects was stale when the final value was derived. If stale data was not used to derive the final value of the object, then the final value can be written to the shared database. If stale data was used, however, then the database server can respond to the requesting server with error information indicating which referenced objects were out-of-date when the final value was derived. Thus, by including version information as part of each update request to a shared database, erroneous updates to shared data can be prevented.

As used herein, a 'modified object' is intended to mean an object with a final value derived by a distributed server, where the modified object is a new version of a corresponding object stored in a shared database. A 'referenced object' is an object used, alone or in combination with one or more other objects, to derive the final value of a modified object. A referenced object can be obtained from a cache of the distributed server and corresponds to an object stored in the shared database. A modified object may be 'derived' by calculating, computing, formulating, building, constructing, estimating, etc. a final value based, at least in part, on one or more referenced objects.

Turning to the infrastructure of FIG. 1, communication system 100 is illustrated in accordance with at least one embodiment. Generally, communication system 100 can be implemented in any type or topology of networks. Network 130 represents a series of points or nodes of interconnected communication paths for receiving and transmitting packets of information that propagate through communication system 100. This network offers a communicative interface between nodes, and in at least one embodiment, may be configured as a local area network (LAN). Teachings of embodiments disclosed herein, however, can be extended to other types of networks including any virtual local area network (VLAN), wide area network (WAN), wireless local area network (WLAN), metropolitan area network (MAN), Intranet, Extranet, virtual private network (VPN), and any other appropriate architecture that facilitates communications in a network environment, or any suitable combination thereof.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data that can be routed between a source node and a destination node on a packet switched network. A packet can include a source network address and a destination network address. These network addresses can be Internet Protocol (IP) addresses in a TCP/IP messaging protocol in at least one embodiment. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests (e.g., database update requests, read requests, write requests, etc.), responses, and queries are forms of network traffic, and therefore, may comprise packets, frames, signals, data, etc.

In at least one embodiment, distributed servers 110(1), 110(2), through 110(N), and database server 120 are network elements, which can be nodes on one or more networks, such as network 130. As use herein, the term 'network element' is meant to encompass network appliances, servers, routers, switches, gateways, bridges, load balancers, processors, modules, or any other suitable device, apparatus, component, or element operable to exchange information in a network environment. Network elements may include any suitable hardware, software, firmware, components, or modules that facilitate the operations thereof, as well as suitable interfaces for receiving, transmitting, and/or otherwise communicating data or information in a network environment. This may be inclusive of appropriate algorithms and communication protocols that allow for the effective exchange of data or electronic information.

In regards to the internal structure associated with communication system 100, distributed servers 110(1)-(N) and database server 120 can each include one or more memory elements (e.g., memory elements 119(1)-(N), 129) for storing information to be used in the operations outlined herein. Distributed servers 110(1)-(N) and database server 120 can keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, or element where appropriate and based on particular needs. Any of the memory items discussed herein (e.g., memory elements 119(1)-(N), 129) should be construed as being encompassed within the broad term 'memory element.' Moreover, the information being used, tracked, sent, or received in communication system 100 could be stored in various storage options (e.g., caches 114(1)-(N), shared database 126), which could be provided in any suitable form such as a database, register, queue, table, cache, list, or other storage structure, all of which can be referenced at any suitable timeframe. Any such storage options (e.g., caches 114(1)-(N), shared database 126) should be construed as being encompassed within the broad term 'memory element' as used herein.

In certain example implementations, the functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as distributed servers 110(1)-(N) and database server 120, may include software modules (e.g., version reporting modules 112(1)-(N), recalculation modules 113(1)-(N), validation module 122) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, distributed servers 110(1)-(N) and database server 120 may each include one or more processors (e.g., processors 118(1)-(N), 128) that can execute software or an algorithm to perform activities as discussed herein. A processor can execute any type of instructions associated with the data to achieve the operations detailed herein. In one example, the processors could transform an element or an article (e.g., data) from one state or thing to another state or thing. By way of example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Distributed servers 110(1)-(N) can maintain local caches 114(1)-(N) of data needed for their operations. The caches are write-through caches in at least one embodiment. The contents of caches 114(1)-(N) can be based off of shared database 126, which maintains the most current or up-to-date versions of objects used in communication system 100. As used herein, an 'object' is intended to include any variable, collection of variables, or any other piece of data that is used in at least one operation of one or more distributed servers 110(1)-(N), and that can be stored in caches 114(1)-(N) and in shared database 126. A variable can be a data item that is changeable over time. Examples of variables can include, but are not limited to, strings, numbers, booleans (e.g., bit representations indicating true/false, on/off, yes/no, etc.), date/time information, rows (e.g., a row of data in a database-style table), globally unique identifiers (GUIDs), tables (e.g., database-style table), identities (e.g., a construct that represents a user's identity, a device's identity, etc.), encrypted strings (i.e., a string that has been encrypted and is readable when explicitly decoded), ObjectReferences (i.e., reference or linkage to other types of objects within the system such as targets, users, etc., but does not contain a copy of the original object), and variants (i.e., a variable having any of the above-referenced types that can fluidly shift between them). An object may include a single variable (e.g., any one of the above-referenced variables) or a collection of variables (e.g., multiple ones of the above-referenced variables).

Distributed servers 110(1)-(N) can each include one or more modules configured to maintain detailed version information of objects in their local caches 114(1)-(N), to request updates to shared database 126 based on a modified object derived from one or more referenced objects, to communicate version information of referenced objects to shared database 126, and to retrieve the most current versions of referenced objects as needed. For ease of illustration, descriptions and examples provided herein may reference, where appropriate, distributed server 110(1) and its components (e.g., 112(1), 113(1), 114(1), 118(1), and 119(1)), although it will be apparent that such descriptions and examples can be applicable to other distributed servers 110(2)-(N) and their components.

When performing an object modification, distributed server 110(1) can communicate various pieces of information to database server 120 in order to update shared database 126. Distributed server 110(1) can provide database server 120 with the final value of the modified object. Additionally, distributed server 110(1) can provide database server 120 with an identification of objects that were referenced when deriving (e.g., calculating, computing, formulating, building, constructing, estimating, etc.) the final value of the modified object. The identification of referenced objects could include variable names or any other suitable identifiers of the referenced objects. Distributed server 110(1) can also provide database server 120 with version information associated with the referenced objects. The version information could include individual version identifiers for each referenced object. In at least one embodiment, the identification of referenced objects and the version information provided to database server 120 may be provided in the form of a list of the referenced objects and respective version identifiers. In at least one embodiment, version reporting module 112(1) could perform one or more operations to accomplish the communication of such information from distributed server 110(1) to database server 120. Both the modified object and the referenced objects may be stored in local cache 114(1). The modified object, however, may not be stored in local cache 114(1) until shared database 126 has been successfully updated with the modified object and distributed server 110(1) has been notified to update its cache 114(1). In addition, in at least one embodiment, version identifiers associated with objects in local cache 114(1) may also be stored in local cache 114(1) and linked to their respective objects.

When distributed server 110(1) uses stale data to modify an object and then attempts to update shared database 126 based on the modified object, database server 120 can send a message containing error information to distributed server 110(1). The error information can inform distributed server 110(1) that the update was not made and that the data used to derive the modified object is stale. The term 'stale data' or 'stale object' is intended to mean an object with a value that is out-of-date or not current. A value that is out-of-date or not current is not synchronized with the authoritative database (e.g., shared database 126). This may be determined when a corresponding object in shared database 126 is associated with a newer version identifier than the stale object's version identifier.

Recalculation module 113(1) can be configured to receive error information from database server 120 related to stale objects used by distributed server 110(1). Recalculation module 113(1) can refresh stale objects by fetching the up-to-date versions of the objects, including the up-to-date version information. The up-to-date objects and version information may be fetched from shared database 126 in at least one embodiment. A process may be initiated to derive (or 'recalculate') the modified object using the up-to-date versions of the referenced objects. Once a new value for the modified object has been derived, distributed server 110(1) can send another update request to shared database 126 using the newest value of the modified object. In at least one embodiment, refreshing stale data, recalculating a modified object, and retrying an update to the shared database can avoid the possibility of an update to the shared database being based on stale data. Thus, transactional consistency can be achieved.

In at least one embodiment, shared database 126 can be provisioned as part of database server 120. Shared database 126 can be configured as an authoritative database in communication system 100. Accordingly, shared database 126 is presumed to have the most current or up-to-date version of each object used in communication system 100. In at least one embodiment, shared database 126 also contains version information associated with each object. Version information could include a version identifier such as a whole number that is incremented each time its associated object is updated or otherwise modified. However, any other appropriate variations of a version identifier could also be used. Shared database 126 can be implemented as a single database or as a group of databases that collectively act as a single database in communication system 100.

Validation module 122 can be configured to perform version checks on data submitted by a server (e.g., distributed servers 110(1)-(N)) when the server communicates a request to update shared database 126 based on a modified object derived from one or more referenced objects. Appropriate action may also be taken based on the results. If it is determined that stale data was used to derive the new value of the modified object, then shared database 126 is not updated with the modified object. Instead, database server 120 can send error information to the server that requested the update. In at least one embodiment, the error information can identify each referenced object that is out-of-date and needs to be refreshed. The error information may also contain version identifiers associated with the referenced objects that need to be refreshed. The error information may additionally contain version identifiers associated with objects in shared database 126 that correspond to the referenced objects that are out-of-date. These version identifiers associated with objects in shared database 126 indicate the most current or up-to-date version of the referenced objects. In at least one embodiment, the error information may be in the form of a list of the out-of-date referenced objects, along with the associated version identifiers from the update request and the version identifiers from shared database 126.

By way of example, assume that a variable V has a value that is modified by distributed server 110(1) according to the following formula: V=V+Z, where Z is another variable. Accordingly, the modified value of V will be a combination of variable V's previous value and the value of variable Z. The server that performs the calculation, distributed server 110(1) in this example scenario, can send a list of referenced objects (i.e., Z and V) to database server 120, along with version numbers of the referenced objects that were used. If the referenced objects are up-to-date in the local cache of distributed server 110(1), then database server 120 can atomically confirm that the referenced objects do not have versions in shared database 126 that are newer than the versions indicated in the message from distributed server 110(1). If any of the referenced objects are determined to be stale, however, then database server 120 can return error information to distributed server 110(1), indicating a set of one or more referenced objects that are stale, and that can be refreshed by fetching up-to-date versions from shared database 126. The server may then fetch the up-to-date versions of the one or more referenced objects, recalculate the value for the modified object, and perform a new update attempt (e.g., via an update request to shared database 126) based on the up-to-date data.

Figure 2:
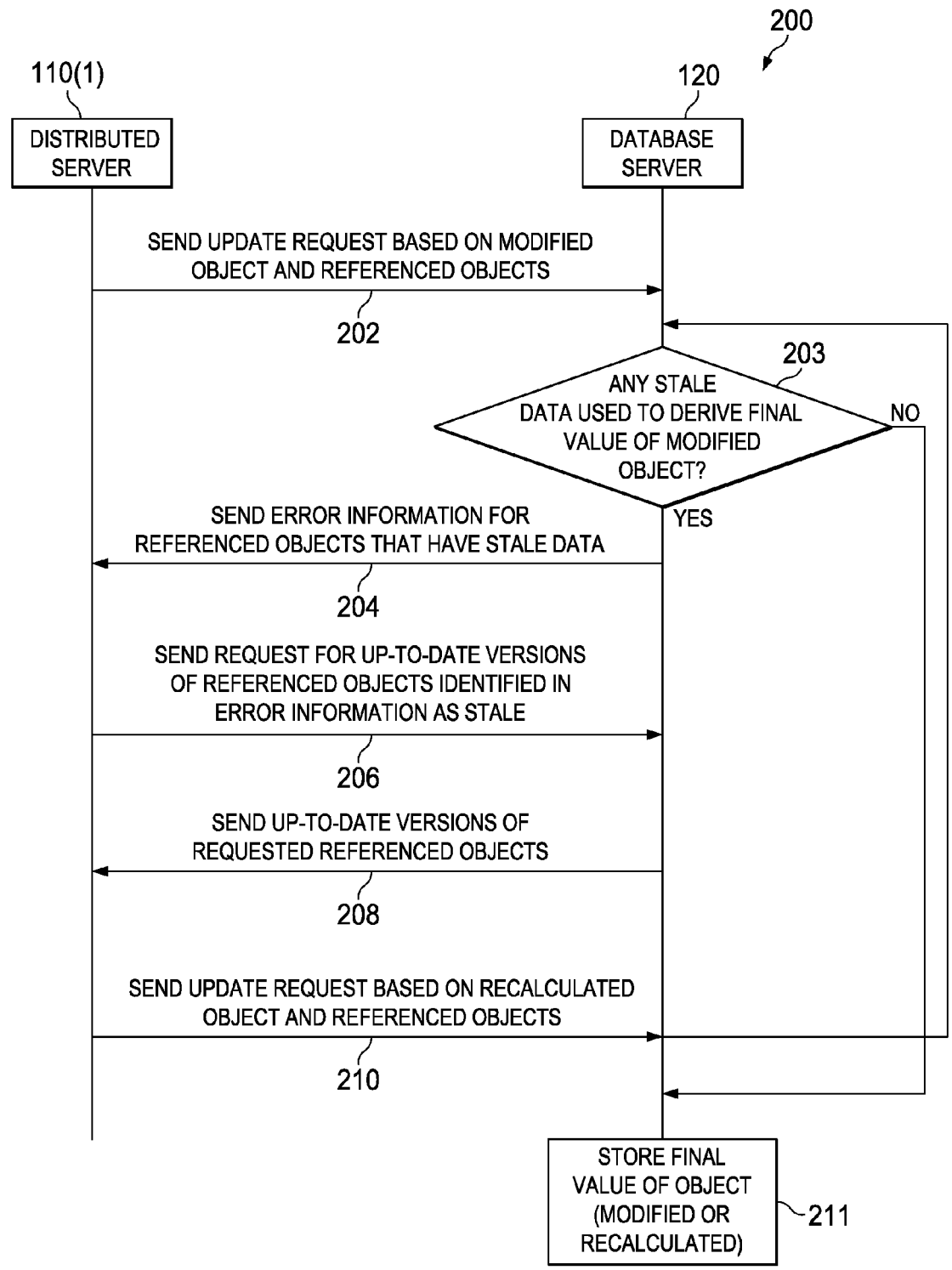
FIG. 2 is a simplified interaction diagram illustrating possible interactions in the communication system according to at least one embodiment.

In FIG. 2, a simplified interaction diagram 200 illustrates potential network communications between distributed server 110(1) and database server 120, according to at least one embodiment. At 202, distributed server 110(1) sends an update request to database server 120 to update shared database 126 based on a modified object and one or more referenced objects. The update request can include the modified object. The update request can also include an identification of referenced objects and their respective version identifiers. The identified referenced objects include objects used to derive the final value of the modified object.

At 203, database server 120 determines whether any stale data was used to derive the final value of the modified object. This determination may be made by comparing the version identifiers of the identified referenced objects and the version identifiers of objects in shared database 126 that correspond to the identified referenced objects. If all of the comparisons pass, then the referenced objects used to derive the modified object are determined to be up-to-date (i.e., not stale). In at least one embodiment, the comparisons pass when the version identifiers being compared are equivalent. When, at 203, it is determined that stale data was not used to derive the final value of the modified object, then at 211, the modified object can be stored in shared database 126. In addition, database server 120 may also generate a new version identifier for the modified object. This new version identifier may be stored with the modified object in shared database 126 and sent to distributed server 110(1) to update the local cache of distributed server 110(1).

In another scenario, when it is determined at 203, that stale data was used to derive the final value of the modified object, then at 204, database server 120 can send error information to distributed server 110(1). The error information can include an identification of the referenced objects that were determined to have stale data and the version identifiers of those referenced objects with stale data. Additionally, the error information may include version identifiers associated with objects in shared database 126 that correspond to the referenced objects identified in the error information. When distributed server 110(1) receives the error information, at 206, distributed server 110(1) sends a request for up-to-date versions of the referenced objects that were identified as stale in the error information. At 208, database server 120 sends the up-to-date versions of the requested referenced objects.

Once distributed server 110(1) receives the up-to-date versions of the requested referenced objects, distributed server 110(1) can recalculate the final value of the modified object. When the recalculation is complete, at 210, distributed server 110(1) can send another update request with the modified object produced from the recalculation, an identification of the referenced objects used in the recalculation, and version identifiers of each of the referenced objects used in the recalculation. Flow may continue at 203, where database server 120 can again determine whether any stale data was used to derive the final value of the modified object. This processing can continue until database server 120 determines that no stale data was used to derive the modified object, and thus, shared database 126 can be updated based on the modified object.

Figure 3:
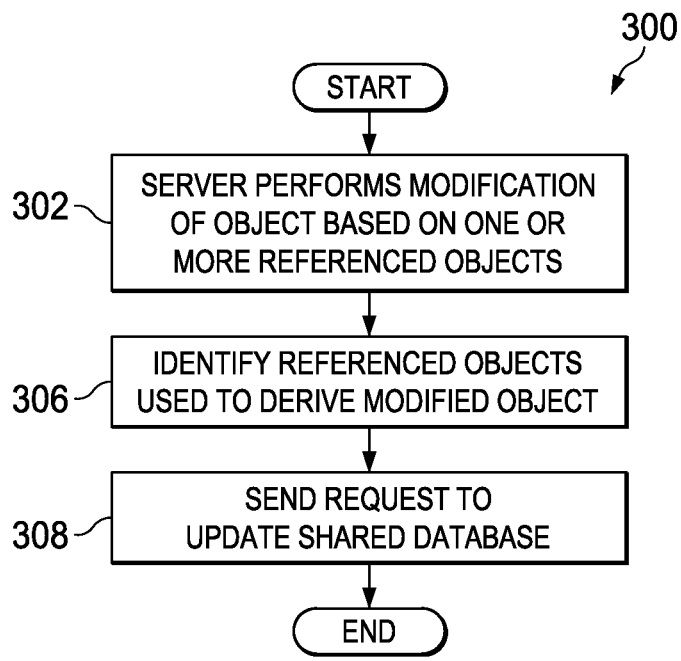
FIG. 3 is a flow diagram illustrating possible activities associated with a distributed server of the communication system according to at least one embodiment.

Turning to FIG. 3, a flow diagram 300 illustrates example activities that may be associated with embodiments of communication system 100 to address cache coherence in updates to a shared database. In at least one embodiment, a set of operations corresponds to the activities of FIG. 3. In one example, a server, such as distributed server 110(1), may perform one or more operations of the set of operations. This server may comprise means, including for example, processor 118(1), for performing such operations. In at least one embodiment, version reporting module 112(1) of distributed server 110(1) is configured to perform, when executed by a processor, one or more operations of the set of operations.

At 302, a distributed server, such as distributed server 110(1), performs a modification of an object based, at least in part, on one or more referenced objects. At 306, the distributed server can identify the referenced objects used to derive the modified object. Each of the referenced objects may be stored in the local cache of the distributed server and may have its own associated version identifier. At 308, the distributed server may send a request to update a shared database, such as shared database 126. The update request can include a final value of the modified object and an identification of the referenced objects and their version information (e.g., respective version identifiers).

Figure 4:
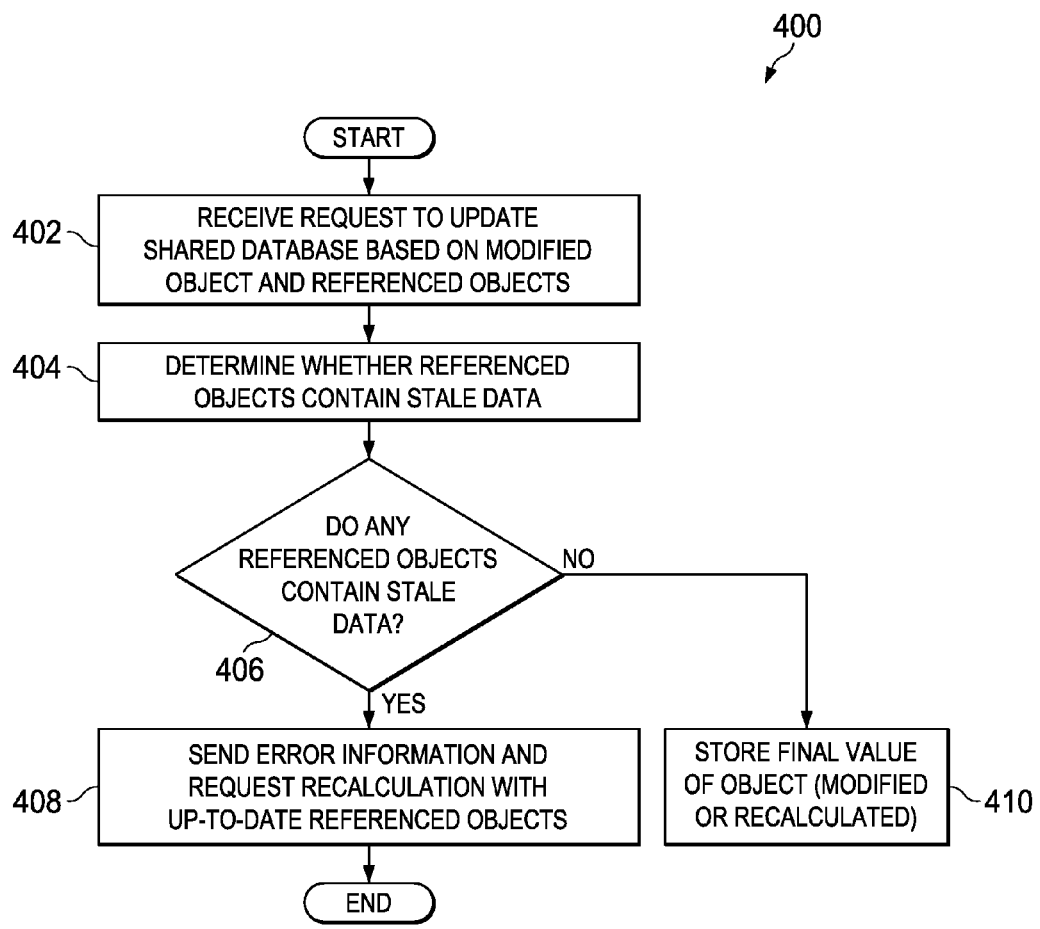
FIG. 4 is a flow diagram illustrating possible activities associated with a database server of the communication system according to at least one embodiment.

In FIG. 4, a flow diagram 400 illustrates example activities that may be associated with embodiments of communication system 100 for addressing cache coherence in updates to a shared database. In at least one embodiment, a set of operations corresponds to the activities of FIG. 4. In one example, a database server, such as database server 120, may perform one or more operations of the set of operations. This database server may comprise means, including for example, processor 128, for performing such operations. In at least one embodiment, validation module 122 of database server 120 is configured to perform, when executed by a processor, one or more operations of the set of operations.

At block 402, the database server receives, from a server such as distributed server 110(1), a request to update a shared database based on a modified object and one or more referenced objects used to derive the modified object. The update request can include the modified object, an identification of the one or more referenced objects, and version identifiers associated with each of the referenced objects. At 404, database server 120 determines whether the referenced objects contain stale data. This may be determined by comparing the version identifiers of the referenced objects and version identifiers of objects in the shared database that correspond to the referenced objects. If the comparisons pass, then the referenced objects do not contain stale data and are considered up-to-date. If none of the referenced objects contains stale data, as determined at 406, then at 410, the modified object may be used to update a corresponding object in the shared database. The update can be performed by storing the final value of the modified object in the shared database.

A new version identifier may also be stored in the shared database in at least one embodiment. A new version identifier may be generated based on the existing version identifier associated with the corresponding object in the shared database. The existing version identifier can be updated to indicate the revision or modification of the object in the shared database. In one example implementation, the version identifier can be a whole number and can be increased by a predetermined amount each time the object is updated. For example, the existing version identifier, which is associated with the object to be updated in the shared database, may be increased by a predetermined amount to obtain a new version identifier. The new version identifier, along with the modified object, can be stored in the shared database. The new version identifier may also be sent to the distributed server to update its local cache.

If any one of the comparisons between version identifiers fails, however, then each referenced object corresponding to a failed comparison is stale. If it is determined, at 406, that any one of the referenced objects identified by the distributed server contains stale data, then at 408, the database server may send (or otherwise provide) error information to the distributed server. The error information may contain an identification of referenced objects that were determined to have stale data, and may request the distributed server to perform a recalculation with up-to-date data. The error information may also contain the most current version identifiers for each of the identified referenced objects to enable the distributed server to fetch up-to-date versions of the referenced objects that are identified in the error information.

Figure 5:
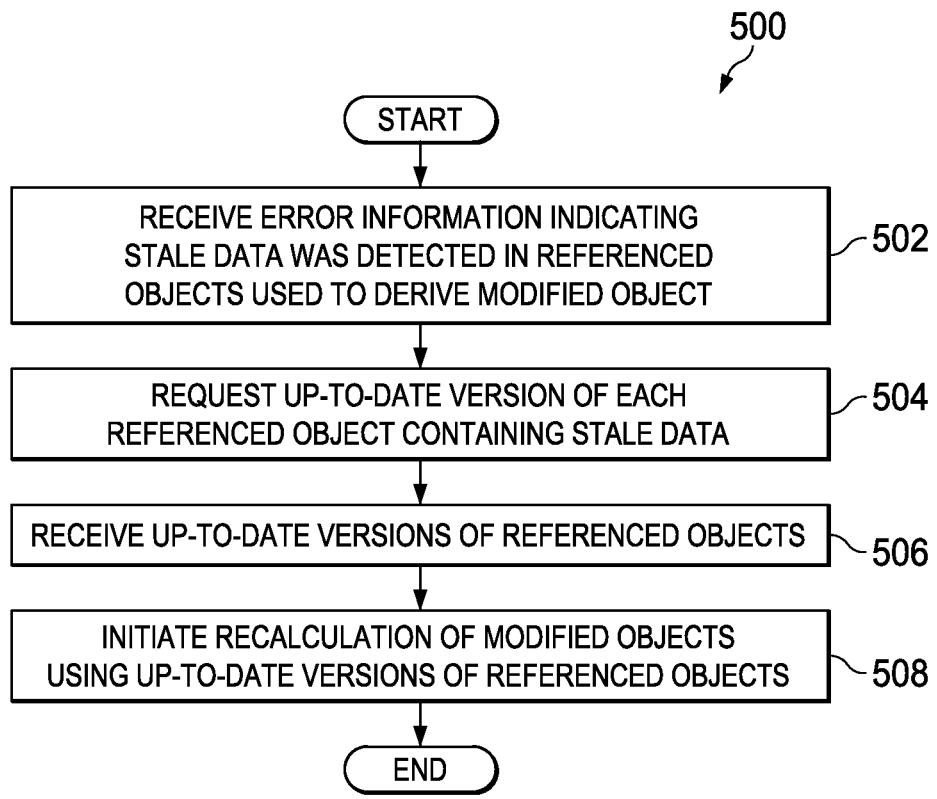
FIG. 5 is a flow diagram illustrating possible further activities associated with a distributed server of the communication system according to at least one embodiment.

Turning to FIG. 5, a flow diagram 500 illustrates example activities that may be associated with embodiments of communication system 100 to address cache coherence in updates to a shared database. In at least one embodiment, a set of operations corresponds to the activities of FIG. 5. In one example, a server, such as distributed server 110(1), may perform one or more operations of the set of operations. This server may comprise means, including for example, processor 118(1), for performing such operations. In at least one embodiment, recalculation module 113(1) of distributed server 110(1) is configured to perform, when executed by a processor, one or more operations of the set of operations.

At 502, a server, such as distributed server 110(1), receives error information from a database server, such as database server 120, indicating that stale data was detected in one or more of the referenced objects used to derive a modified object. The error information may include an identification of the referenced objects that were determined to have stale data. At 504, the distributed server can request, from the shared database, the up-to-date version of each referenced object containing stale data. At 506, the distributed server may receive the up-to-date versions of the requested referenced objects from the shared database. At 508, the distributed server may initiate a recalculation of the modified object based on the up-to-date versions of the referenced objects. In at least one embodiment, activities associated with FIG. 3 may be performed, in which the distributed server performs a modification of the object based on one or more referenced objects, referenced objects are identified, and a new request to update the shared database based on the recalculated modified object is sent to the database server.

In some instances, a first server (e.g., distributed server 110(1)) may need to request an update to the shared database multiple times before the database server can perform the requested update. Multiple update requests may be necessary, for example, when a second server (e.g., distributed server 110(2)) sends an intervening request to update the shared database while the first server (e.g., distributed server 110(1)) is refreshing referenced objects and recalculating a modified object. Thus, the subsequent update request by the first server is based on referenced objects that became stale due to the update performed by the database server in response to the intervening update request from the second server. By keeping track of every referenced object each time an object is modified, and including this information in update requests to the shared database, the database server can detect each update that is based on stale data and can preserve the integrity of the shared database.

Note that with the example provided above, as well as numerous other examples provided herein, interaction might be described in terms of two, three, or four elements, modules, components, etc. However, this has been done for purposes of clarity and example only. In certain cases, it may be easier to describe one or more of the functionalities of a given set of flows by only referencing a limited number of elements. It should be appreciated that these elements, components, modules, and/or the like (and their teachings) are readily scalable and can accommodate a large number of such elements, modules, and components, etc., as well as more complicated/sophisticated arrangements and configurations. In addition, it should also be noted that these elements, modules and/or components may alternatively be combined in any suitable arrangements and configurations. Accordingly, the examples provided should not limit the scope or inhibit the broad teachings of communication system 100 as potentially applied to a myriad of other architectures.

It is also important to note that the operations in the preceding flow diagrams illustrate only some of the possible scenarios and patterns that may be executed in association with addressing cache coherence in updates to a shared database. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Communication system 100 may provide substantial flexibility in that any suitable arrangements, chronologies, configurations, and timing mechanisms may be provided without departing from the teachings of the present disclosure.

What is claimed is:

1. An apparatus, comprising:
   at least one processor; and
   at least one memory element comprising instructions that when executed by the at least one processor cause the apparatus to:
   receive a request to update a particular object based on a modified object, wherein the particular object is one of a number of objects in a shared database, and wherein the request includes an identification of one or more referenced objects and version information of the one or more referenced objects; and
   determine whether any one of the referenced objects is stale based on the version information, wherein the particular object is updated based on the modified object if none of the referenced objects is determined to be stale.

2. The apparatus of claim 1, wherein
the particular object in the shared database is not updated based on the modified object if any one of the referenced objects is determined to be stale.

3. The apparatus of claim 1, wherein a determination that a referenced object is stale is based on a comparison of a version identifier of the referenced object and a version identifier of an object in the shared database that corresponds to the referenced object, wherein the version information includes the version identifier of the referenced object.

4. The apparatus of claim 1, wherein the at least one memory element comprises further instructions that when executed by the at least one processor cause the apparatus to:
provide error information if at least one of the referenced objects is stale, wherein the error information includes an identification of the at least one referenced object that is stale.

5. The apparatus of claim 4, wherein the error information includes version information associated with at least one object in the shared database, wherein the at least one object in the shared database corresponds to the at least one referenced object identified in the error information as stale.

6. The apparatus of claim 1, wherein the modified object was derived, at least in part, based on the one or more referenced objects.

7. The apparatus of claim 1, wherein the update request is received from a distributed server.

8. A method, comprising:
receiving a request to update a particular object based on a modified object, wherein the particular object is one of a number of objects in a shared database, and wherein the request includes an identification of one or more referenced objects and version information of the one or more referenced objects;
determining whether any one of the referenced objects is stale based on the version information, wherein the particular object is updated based on the modified object if none of the referenced objects is determined to be stale.

9. The method of claim 8,
wherein the particular object in the shared database is not updated based on the modified object if any one of the referenced objects is determined to be stale.

10. The method of claim 8, wherein the determining that the referenced object is stale is based on a comparison of a version identifier of the referenced object and a version identifier of an object in the shared database that corresponds to the referenced object, wherein the version information includes the version identifier of the referenced object.

11. The method of claim 8, further comprising:
providing error information if at least one of the referenced objects is stale, wherein the error information includes an identification of the at least one referenced object that is stale.

12. The method of claim 11, wherein the error information includes version information associated with at least one object in the shared database, wherein the at least one object in the shared database corresponds to the at least one referenced object identified in the error information as stale.

13. The method of claim 8, wherein the modified object was derived, at least in part, based on the one or more referenced objects.

14. The method of claim 8, wherein the update request is received from a distributed server.

15. The method of claim 8, wherein the error information indicates at least one other referenced object of the one or more referenced objects is stale.

16. A method comprising:
sending a request to update a shared database based on a first modified object, wherein the first modified object was derived using one or more referenced objects;
receiving error information indicating a referenced object of the one or more referenced objects is stale if a comparison of the referenced object to an up-to-date version of the referenced object indicates the referenced object is stale;
receiving the up-to-date version of the referenced object if the referenced object is stale; and
sending a second request to update the shared database based on a second modified object, wherein the second modified object was derived using at least the up-to-date version of the referenced object.

17. The method of claim 16, further comprising:
receiving a new version identifier of the second modified object; and
associating the new version identifier with the second modified object in a local cache of a distributed server.

18. The method of claim 17, wherein the request to update the shared database includes an identification of the one or more referenced objects and version information associated with the one or more referenced objects.

19. The method of claim 18, wherein the version information includes one or more version identifiers associated respectively with the one or more referenced objects.

20. The method of claim 16, wherein the error information includes an identification of the referenced object that is stale and version information of the up-to-date version of the referenced object.

21. An apparatus comprising:
at least one processor; and
at least one memory element comprising instructions that when executed by the at least one processor cause the apparatus to:
send a request to update a shared database based on a first modified object, wherein the first modified object was derived using one or more referenced objects;
receive error information indicating a referenced object of the one or more referenced objects is stale if a comparison of the referenced object to an up-to-date version of the referenced object indicates the referenced object is stale;
receive the up-to-date version of the referenced object if the referenced object is stale; and
send a second request to update the shared database based on a second modified object, wherein the second modified object was derived using at least the up-to-date version of the referenced object.

22. The apparatus of claim 21, the at least one memory element comprising further instructions that when executed by the at least one processor cause the apparatus to:
receive a new version identifier of the second modified object; and
associate the new version identifier with the second modified object in a local cache of a distributed server.

23. The apparatus of claim 22, wherein the request to update the shared database includes an identification of the one or more referenced objects and version information associated with the one or more referenced objects.

24. The apparatus of claim 21, wherein the error information includes an identification of the referenced object that is stale and version information of the up-to-date version of the referenced object.

\* \* \* \* \*